United States Patent [19]

Brugel et al.

[11] Patent Number: 5,175,218
[45] Date of Patent: Dec. 29, 1992

[54] CROSSLINKING POLYMERS WITH COMPOUNDS CONTAINING XANTHENE GROUPS

[75] Inventors: Edward G. Brugel; Israel A. David, both of Wilmington; Frank P. Gay, Hockessin, all of Del.

[73] Assignee: E. I. Du Pont de Nemours and Company, Wilmington, Del.

[21] Appl. No.: 589,849

[22] Filed: Sep. 28, 1990

[51] Int. Cl.⁵ .................. C08F 283/06; C08G 65/48; C08G 8/02; C08G 14/00

[52] U.S. Cl. .................... 525/471; 525/390; 525/397; 525/462; 528/125; 528/126; 528/128; 528/220

[58] Field of Search ........ 525/471, 390, 397; 528/125, 126, 128, 220

[56] References Cited

U.S. PATENT DOCUMENTS

| | | | |
|---|---|---|---|
| 4,269,953 | 5/1981 | Brand | 525/534 |
| 4,340,454 | 7/1982 | Martin et al. | 528/190 |
| 4,739,052 | 4/1988 | Hüsler et al. | 544/174 |
| 4,751,102 | 6/1988 | Adair et al. | 427/53.1 |
| 4,764,566 | 8/1988 | Swedo | 525/390 |
| 4,786,699 | 11/1988 | Dewhirst | 528/104 |
| 4,801,392 | 1/1989 | Adair et al. | 252/62.54 |
| 4,861,810 | 8/1989 | Dewhirst | 528/122 |
| 4,924,009 | 5/1990 | Neckers et al. | 549/223 |
| 4,987,171 | 1/1991 | Brugel | 525/471 |

OTHER PUBLICATIONS

J. Heterocyclic Chem., vol. 25 (1988) pp. 1199-1203.

Primary Examiner—John Kight, III
Assistant Examiner—P. Hampton-Hightower

[57] ABSTRACT

This invention relates to a process for cross-linking polymers that are crosslinkable by free radicals and/or contain aromatic rings by heating these polymers with a compound containing xanthene groups. The crosslinked polymers have improved chemical resistance.

25 Claims, No Drawings

CROSSLINKING POLYMERS WITH COMPOUNDS CONTAINING XANTHENE GROUPS

FIELD OF INVENTION

This invention relates to a process for crosslinking selected polymers that are crosslinkable by free radicals and/or contain aromatic rings, by heating the polymer in the presence of oxygen, with a compound containing one or more xanthene groups. Also provided are a blend of selected polymers and selected xanthene compounds and the product of the said process.

BACKGROUND OF THE INVENTION

It is known in the art that the crosslinking of polymers can improve certain physical properties, such as chemical and solvent resistance, and retention of shape at high temperatures. It is the purpose of this invention to provide a method for the crosslinking of polymers that can normally be crosslinked by free radicals and/or contain aromatic rings, by heating the polymer in the presence of oxygen while the polymer is in contact with a compound containing one or more xanthene groups.

U.S. Pat. No. 4,751,102 describes a composition which is a radiation-cureable ink which contains free radical polymerizable compounds and a cationic dye. One such dye described (at col. 4, lines 30-40) contains a xanthene-like moiety, which however, does not contain a hydrogen atom at the 9-position (infra). Also the polymerization of the monomers takes place upon exposure to radiation, not heat. U.S. Pat. No. 4,801,392 describes a very similar system for use in magnetic recording compositions.

U.S. Pat. No. 4,764,566 describes the crosslinking of polymers containing aromatic nuclei (rings) by incorporating a biphenylene unit into the polymer and subsequently heating the polymer to effect crosslinking. No mention is made of using xanthene groups, and the presence of oxygen is not required. Other variations of using biphenylene units in a similar manner are cited within this patent.

SUMMARY OF THE INVENTION

This invention concerns a process for the crosslinking of polymers, comprising, contacting a polymer that is free radically crosslinkable and/or contains aromatic rings, with oxygen, and with a xanthene compound that contains one or more xanthene groups at a temperature of about 200° C. to about 400° C. for a period of time sufficient to effect crosslinking, provided that said xanthene compound has at least one hydrogen atom in the 9 position of one or more of the the xanthene groups.

This invention also concerns a composition, comprising, a polymer that is free radically crosslinkable and/or contains an aromatic ring, and about 1 mole percent to about 20 mole percent based on the number of monomer units in said polymer, of a xanthene compound that contains one or more xanthene groups, provided that said xanthene compound has at least one hydrogen atom in the 9 position of one or more of the xanthene groups.

Also provided are the products of the process.

DETAILS OF THE INVENTION

The polymers useful in this invention include those that are crosslinkable by free radicals and those that contain aromatic rings. Polymers that are both free radically crosslinkable and contain aromatic rings will of course also be operable. By free radically crosslinkable polymer is meant a polymer that forms crosslinks when it is exposed to free radicals, generated for example, by peroxides, azonitriles and the like. Such polymers are well known to those skilled in the art, for example see Encyclopedia of Polymer Chemistry, Vol. 4, John Wiley & Sons, Inc., New York, 1966, pp. 337-352, which is hereby included by reference. Free radically crosslinkable polymers useful in the present invention include, but are not limited to polypropylene, poly(butylene terephthalate), silicone rubber, and polyethylene. Preferred radically crosslinkable polymers are polypropylene and poly(butylene terephthalate).

Polymers containing an aromatic ring include those containing ring (systems) such as benzene, naphthalene, biphenyl, anthracene, and the like. Especially preferred aromatic rings are benzene, naphthalene and biphenyl. Such polymers include, but are not limited to poly(etheretherketone) (PEEK, infra), poly(etherketoneketone) (PEKK, infra), poly(phenylene oxide), and poly(phenylene terephthalate). Preferred aromatic ring containing polymers are PEEK and PEKK, the repeat units of which are shown below.

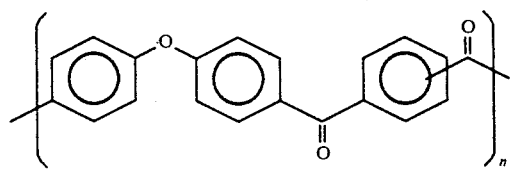

PEKK

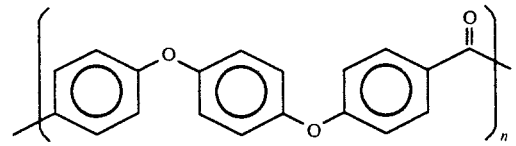

PEEK

The xanthene compound used in the present invention has one or more xanthene groups and contains a hydrogen atom in the 9 position of one or more of the xanthene groups. The structure of a xanthene group is shown below, together with the numbering system for xanthenes. By xanthene group herein is meant a group that has an oxygen or a sulfur atom in the 10 position, the latter sometimes referred to as thioxanthene.

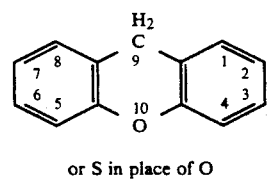

or S in place of O

If more than one xanthene group is present in the compound, the xanthene groups may be connected by any group which is stable at the reaction conditions, or may be connected directly via a covalent bond. The connection between the xanthene groups may be through any position on the xanthene group so long as there is at least one hydrogen atom in the 9 position of at least one xanthene group per molecule. In addition the xanthene group of the xanthene compound may be substituted with any group which is stable at the reaction temperatures and does not interfere with the reaction. It is preferred if the amount of xanthene compound present be about 1 mole percent to about 20 mole percent of the total number of monomer units present in the polymer.

The xanthene compounds used in the present process can be made by processes known to those skilled in the art. Examples of the synthesis of such compounds are found in: U. Pindur and R. Deschner, J. Heterocycl. Chem., vol. 25, (1988) p. 1199–1203; and Experiment 1 herein. Methods of synthesis of such compounds are known to those skilled in the art. Useful xanthene compounds include, but are not limited to, bis[4-(9-xanthydryl)phenyl]ether, xanthene, xanthydrol, 9-phenylxanthene and

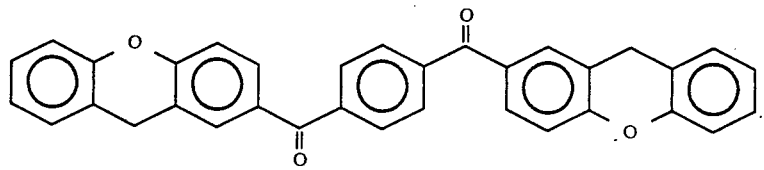

Preferred xanthene compounds are bis[4-(9-xanthydryl)phenyl] ether and

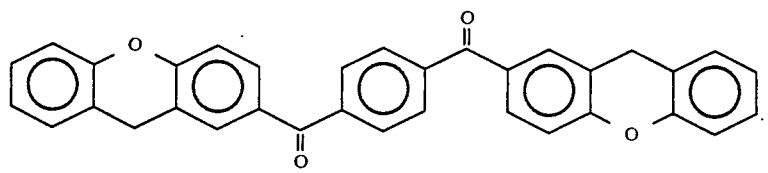

In order for crosslinking to occur, oxygen must be present when the mixture of the xanthene and polymer is heated. It is convenient and preferred if the oxygen is present as air.

The polymer may be mixed with the xanthene compound either as a powder, or when the polymer is molten, or when the polymer is in solution. If it is necessary to heat the polymer above about 200° C. to melt it, the mixing can be done under an inert (oxygen free) atmosphere so the polymer will not be crosslinked during the mixing. Polymer mixtures, whether mixed by powder blending or melt blending, with the xanthene compound are stable at ambient temperatures, or at elevated temperatures if oxygen is absent. Therefore blends of the xanthene compound and polymer may be molded or otherwise formed in the melt into a shaped part under an oxygen free atmosphere, and thereafter heated from about 200° C. to about 400° C., preferably about 250° C. to about 350° C., in the presence of oxygen to effect crosslinking, an advantage of the instant process. It is preferred if the polymer is semicrystalline and does not melt below the process temperature, so that crosslinking can be effected without distorting or melting the polymer part. The polymer part may be, for example, a molded part, an extrusion, a composite part, a fiber, or a film.

The crosslinking process temperature is about 200° C. to about 400° C., preferably about 250° C. to about 350° C. Of course the polymer and xanthene compound should not, by themselves, undergo any extensive degradation under these conditions. Care should be taken to avoid volatilization of lower molecular weight xanthene compounds. The amount of time necessary to crosslink the polymer will be dependent on the temperature used, the polymer and the xanthene compound. Typically, crosslinking will be achieved after about 30 min at 250° C. and after about 1–5 min at 300° C.

This invention also concerns a composition, comprising, a polymer that is free radically crosslinkable and/or contains an aromatic ring, and about 1 mole percent to about 10 mole percent based on the number of monomer units in said polymer, of a xanthene compound that contains at least one hydrogen atom in the 9 position of the xanthene group. The definitions of free radically crosslinkable and/or aromatic ring containing polymer are as previously described, as are the specific and preferred polymers for the composition. The xanthene compounds are also as described above. The composition may be formed into a shaped part, as described above. The composition is useful for producing crosslinked polymers by the above process.

The crosslinked composition herein provided in the form of shaped parts such as moldings, extrusions, composite parts, fibers and films, are especially useful in environments with harsh chemical exposures such as acids. Such uses include filters for furnaces burning high sulfur content coals, protective clothing, and engineering parts. Such shaped parts also have improved dimensional stability at elevated temperatures.

In the following examples, polymers were tested to determine if they are crosslinked by attempting to dissolve them in known solvents for the particular polymer. If the polymer was insoluble, it was deemed to be crosslinked. The PEEK polymer, Grade 380, was obtained from ICI Americas, Inc., Wilmington, DE, while the PEKK polymer was made by the procedure of U.S. Pat. No. 4,816,556, which is incorporated herein by reference. The other polymers used were ordinary commercial grades, widely available.

EXPERIMENT 1

A di-Grignard reagent was made by adding over ~1 hr a solution of 6.56 g (0.02 mole) of 4,4'-dibromophenyl ether in 55 cc of tetrahydrofuran to 1.07 g (0.044 g-atoms) of pre-baked (120° C. under nitrogen atmosphere for several hr) and iodine (~2 small crystals)-initiated magnesium turnings in a round-bottomed flask under a nitrogen atmosphere with good stirring. The mixture was then heated under reflux overnight. Xanthone (7.85 g, 0.04 mole) was added portionwise to the reaction mixture under a nitrogen atmosphere at room temperature with good stirring. The reaction mixture was drowned in a solution of 50 cc of concentrated hydrochloric acid in ~500 cc of ice-water with good stirring. The resulting gummy suspension was extracted with diethyl ether. The ether extract was washed with water until the washings were neutral, and dried over anydrous sodium sulfate. The ether was removed in a rotary evaporator under reduced pressure. The impure, yellow, gummy residue (10.9 g) was used further without purification. Mass spectrometry showed it to contain bis[4-(9-hydroxy-9-xanthydryl)phenyl] ether.

A solution of the impure product (4 g) in a combination of 130 cc formic acid, 100 cc acetic acid, and 130 cc of acetic anhydride was heated in a nitrogen atmosphere under reflux for several hr. The cooled reaction mixture was drowned in water, and the resulting solids collected by suction filtration, and purified by preparative high performance liquid chromatography HPLC) on an octadecyl-silanized reverse-phase column using an elution gradient of 50:50 to 0:100 volume ratio of water:methanol. Mass spectrometry showed the resulting white crystalline solid to be bis[4-(xanthydryl)-phenyl] ether.

EXAMPLE 1

PEKK polymer (0.75 g) was heated in a nitrogen atmosphere with 0.13 g (10 mole %) of bis[4-(9xanthydryl)phenyl ether:

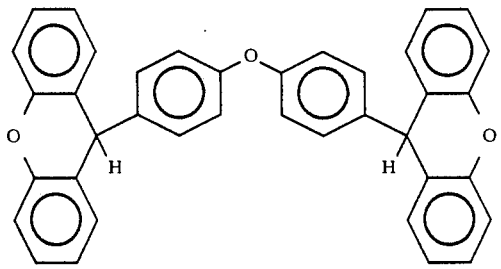

for 15 min at 360° C. The polymer remained molten at this temperature. On cooling to room temperature, it solidified and was soluble in both sulfuric acid and hexafluoroisopropyl alcohol.

The above product was heated in air at 300° C. for 30 min. It was then insoluble in sulfuric acid at 100° C. and in hexafluoroisopropyl alcohol at room temperature.

EXAMPLE 2

Poly(etheretherketone) (PEEK) (0.077 g) was heated with 0.014 g (10 mole %) of the bis-xanthene of Example 1 in a nitrogen atmosphere for 15 min at 375° C. with stirring. The polymer remained molten. An air stream was directed into the vessel to displace the nitrogen, and then heating was continued in static air at this temperature. The polymer gelled. After cooling to room temperature, the solid obtained was insoluble in a 50:50 volume mixture of 1,2,4-trichlorobenzene and phenol at 180° C. for 2 hr. Both the gelation and insolubility show that the polymer was crosslinked. The polymer alone, without bis-xanthene, treated in the same fashion, remained molten after 30 min of the air heating and remained soluble in the solvent.

EXAMPLE 3

A mixture of 0.073 g of polypropylene and 0.09 g (10 mole %) of the bis-xanthene of Example 1 was treated in the same fashion as for Example 2, except at 270° C., with the same results. In this case, solubility was tested in o-dichlorobenzene at 150° C. A control polymer not mixed with bis-xanthene remained molten and soluble in the solvent.

EXAMPLE 4

A mixture of 0.052 g of poly(tetramethylene terephthalate) and 0.012 g (10 mole %) of the bis-xanthene of Example 1 was treated in the same fashion as for Example 2, except at 300° C., with the same results. Solubility was tested in a 3:1 volume mixture of methylene chloride and trifluoroacetic acid. A control polymer without bis-xanthene remained molten and soluble.

EXAMPLE 5

An intimate mixture of 0.3 g of PEKK polymer and 0.018 g (10 mole %) of xanthene was heated at 345° C. in air for 30 min. The polymer darkened and gelled after about 15-20 min. The resulting material was insoluble in a 50:50 volume mixture of 1,2,4-trichlorobenzene and phenol at 180° C. for 2 hours and in sulfuric acid at 100° C. for 1 hour.

EXAMPLE 6

Example 5 was repeated with 0.020 g (10 mole %) of xanthydrol in place of the xanthene with the same results.

EXAMPLE 7

An intimate mixture of 0.3 g of PEKK polymer and 0.026 g (10 mole %) of 9-phenylxanthene was heated at 350° C. in air for 30 min. The resulting material was insoluble in a 50:50 volume mixture of 1,2,4-trichlorobenzene and phenol at 180° C. for 2 hours and in sulfuric acid at 100° C. for 1 hour.

EXAMPLE 8

1,4-Bis-(2-xanthenoyl)benzene was synthesized in this fashion: To a solution of 11.84 g of xanthene and 2.64 g of terephthaloyl chloride in 79 cc of o-dichlorobenzene chilled at 11° C. for 40 min,.was added, in a nitrogen atmosphere and without further cooling, 8.40 g of aluminum chloride portionwise so that the temperature did not rise above 26° C. The resulting deep reddish-brown solution was stirred for 45 min. It was then mixed with 240 cc of o-dichlorobenzene, and water was added. The mixture was heated to 98°-100° C. with stirring, and kept at that temperature for 30 min. Two layers formed. The organic layer was separated, and after cooling to room temperature, the solid that separated was collected by filtration. The solids were washed with methanol, methylene chloride, twice again with methanol, and dried under vacuum at ~90° C. for several hours. Mass spectrometry showed this solid to be the desired compound and indicated no impurities.

A mixture of 0.30 g (0.001 mole) PEKK and 0.05 g (0.0001 mole) 1,4-bis-(2-xanthenoyl)benzene was heated, with manual stirring in a nitrogen atmosphere for 30 min at 360° C. The mixture melted and darkened, but did not gel. A mixture of the same composition was heated in air for 30 min at 350° C. It gelled almost immediately after heating began. The gelled product was insoluble in sulfuric acid at 100° C for 1 hour and in a 50:50 volume mixture of 1,2,4-trichlorobenzene:phenol at 180° C. for 2 hours.

Although preferred embodiments of the invention have been described hereinabove, it is to be understood that there is no intention to limit the invention to the precise constructions herein disclosed, and it is to be further understood that the right is reserved to all changes coming within the scope of the invention as defined by the appended claims.

What is claimed is:

1. A process for the crosslinking of polymers, comprising contacting a polymer that is free radically crosslinkable or contains aromatic rings or both, with oxygen, and with a xanthene compound having one or more xanthene groups, at a temperature of about 200° C. to about 400° C. for a period of time sufficient to effect crosslinking, provided that said xanthene compound has at least one hydrogen atom in the 9 position of one or more of the xanthene groups.

2. The process as recited in claim 1 wherein said temperature is about 250° C. to about 350° C.

3. The process as recited in claim 1 wherein said xanthene compound present is about 1 mole percent to about 20 mole percent of the total number of monomer units present in the polymer.

4. The process as recited in claim 3 wherein said xanthene compound present is about 1 mole percent to about 10 mole percent of the total number of monomer units present in the polymer.

5. The process as recited in claim 1 wherein said polymer is selected from polypropylene, poly(butylene terephthalate), PEEK, PEKK- poly(phenylene oxide), and polyethylene.

6. The process as recited in claim 1 wherein said polymer is PEEK or PEKK.

7. The process as recited in claim 3 wherein said polymer is PEEK or PEKK.

8. The process as recited in claim 6 wherein said xanthene compound is bis[4-(9-xanthydrol)phenyl]ether or

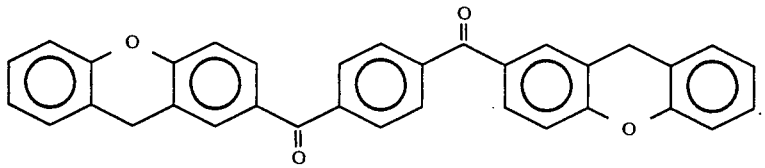

9. The process as recited in claim 2 wherein said xanthene compound present is about 1 mole percent to about 20 mole percent of the total number of monomer units present in the polymer, and wherein said polymer is PEEK or PEKK.

10. The process as recited in claim 2 wherein said polymer is PEEK or PEKK.

11. The crosslinked polymeric product of the process of claim 1.

12. The crosslinked polymeric product of the process of claim 2.

13. The crosslinked polymeric product of the process of claim 3.

14. The crosslinked polymeric product of the process of claim 5.

15. The crosslinked polymeric product of the product of claim 9.

16. The process as recited in claim 1 wherein the polymer is in the form of a shaped part.

17. The process as recited in claim 5 wherein the polymer is in the form of a shaped part.

18. The process as recited in claim 9 wherein the product is in the form of a shaped part.

19. The product of the process of claim 16.

20. A composition, comprising, a polymer that is free radically crosslinkable and/or contains an aromatic ring, and about 1 mole percent to about 20 mole percent based on the number of monomer units in said polymer, of a xanthene compound having one or more xanthene groups, provided that said xanthene compound contains at least one hydrogen atom in the 9 position of one or more of the xanthene groups.

21. The composition as recited in claim 20, wherein said polymer is PEEK or PEKK.

22. The composition as recited in claim 20, in the form of a shaped part.

23. The composition as recited in claim 21, in the form of a shaped part.

24. The process as recited in claim 1 wherein said xanthene compound is bis[4-(9-xanthydryl)-phenyl]ether, xanthene, xanthydrol, 9-phenylxanthene or

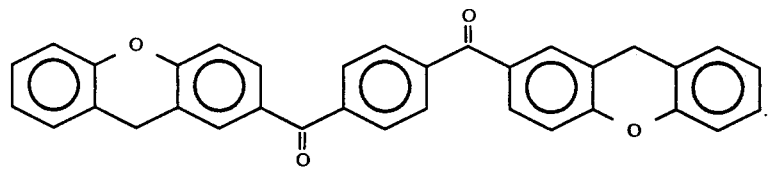

25. The composition as recited in claim 20 wherein said xanthene compound is bis[4-(9-xanthydryl)-phenyl]ether, xanthene, xanthydrol, 9-phenylxanthene or

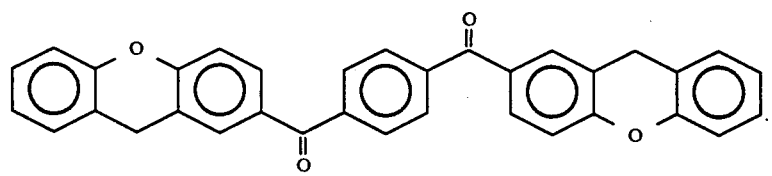

* * * * *

UNITED STATES PATENT AND TRADEMARK OFFICE
CERTIFICATE OF CORRECTION

PATENT NO. : 5,175,218

DATED : December 29, 1992

INVENTOR(S) : Brugel et al.

It is certified that error appears in the above-identified patent and that said Letters Patent is hereby corrected as shown below:

Column 7, line 7, change "radially" to --radically--.

Signed and Sealed this

Twelfth Day of October, 1993

Attest:

BRUCE LEHMAN

Attesting Officer

Commissioner of Patents and Trademarks